Patented Feb. 1, 1949

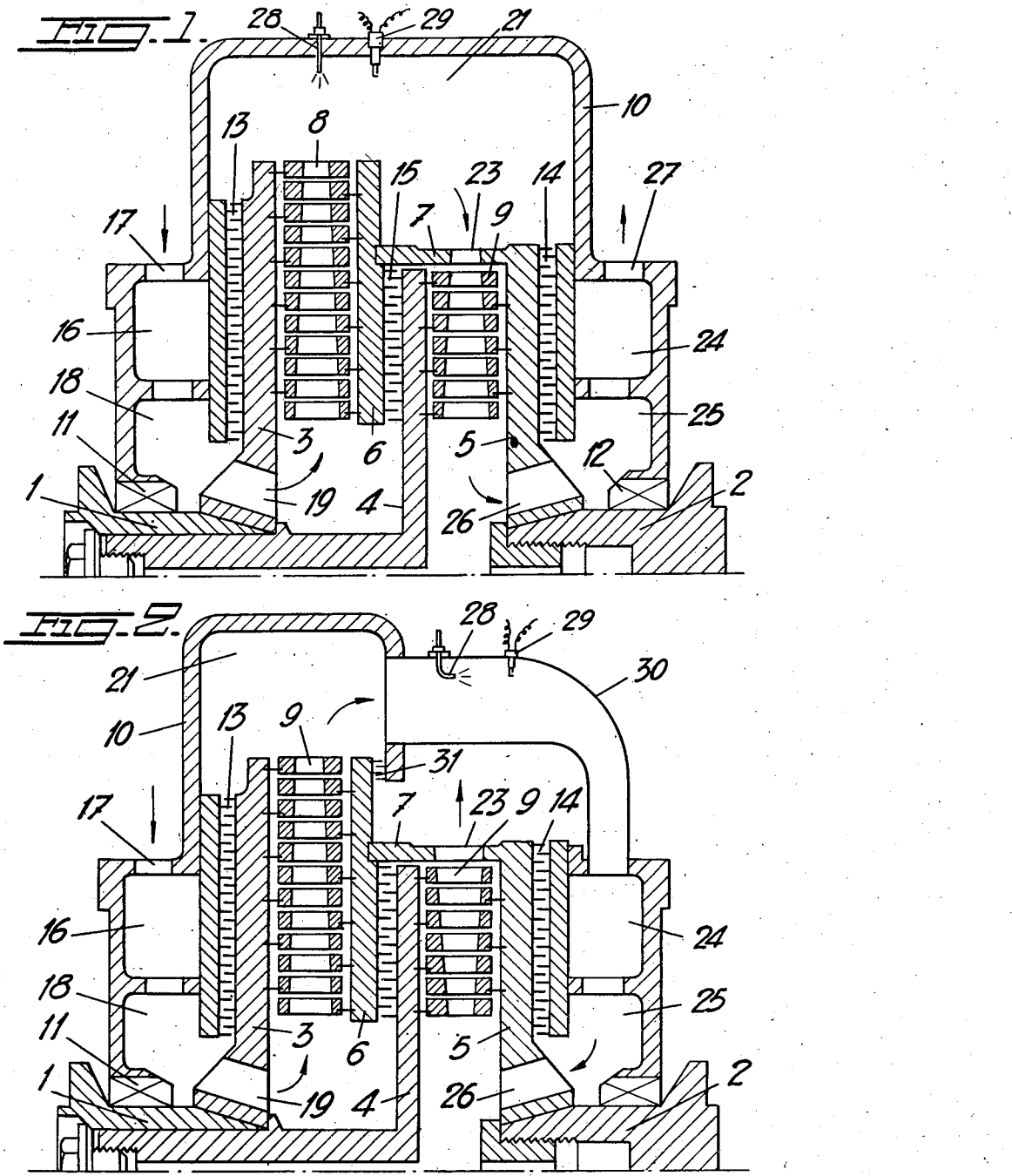

2,460,523

UNITED STATES PATENT OFFICE 2,460,523

COMBINED GAS TURBOCOMPRESSOR AND GAS TURBINE

Ragnar Olov Jacob Möller, Finspong, Sweden, assignor to Svenska Turbinfabriks Aktiebolaget Ljungström, Finspong, Sweden, a corporation of Sweden Application December 20, 1945, Serial No. 636,201

3 Claims. (Cl. 60—41)

The present invention relates to a combined gas turbo-compressor and gas turbine of the type in which both the turbo-compressor and the gas turbine are of the radial flow type.

In my copending U. S. patent application Ser. No. 528,303, now abandoned, a combined gas turbo-compressor and gas turbine of this type is described in which the turbo-compressor and the gas turbine are combined to a unit similar to a multiple disc turbine the discs of which are alternately supported by two shafts adapted for rotation in opposite directions and so related to each other as to form a tortuous fluid passage between themselves with the blades of the compressor section and those of the gas turbine section located in axially spaced radial portions of said tortuous passage. As a feature of the unit forming the object of the above said pending application adjacent bladings of the compressor and the gas turbine proper communicate with a combustion chamber at their inner peripheries. Thus in order to reach the combustion chamber the air to be compressed in said compressor blading has to flow inwardly therethrough. To obtain this flow of the air being compressed the said compressor blading has to yield work for balancing the action of the centrifugal force in addition to the work required for effecting the compression.

The object of the present invention is to relieve the compressor from said additional work. To this end the compressor blading is constructed for passing the air outwardly while compressing it.

The gas turbine blading next to the compressor blading may be constructed either for inward or outward flow of the driving fluid. The combustion chamber is in both cases in communication with the outer end of the compressor blading but may be in communication with the outer or inner end of the adjacent gas turbine blading.

In the accompanying drawing the two embodiments of the invention above indicated are illustrated in a diagrammatic manner in Figs. 1 and 2 respectively. Both figures are axial sections of the upper half of a combined turbo-compressor and gas turbine unit in accordance with the invention.

The same references are used to indicate similar parts in both figures.

In Fig. 1, the numerals 1 and 2 designate the ends of two turbine shafts adapted for rotation in opposite directions. Shaft end 1 supports directly a turbine disc 3 and, by means of an extended hub, a second turbine disc 4 in spaced relation to disc 3. Shaft end 2 supports directly a turbine disc 5 and this in its turn carries by means of a cylindrical flange 7 at its outer periphery a second turbine disc 6 located between the turbine discs 3 and 4.

Located in the space between the turbine discs 3 and 6 is a turbo-compressor blading 8 the individual blades of which are supported alternately by one and the other of said two discs so as to rotate in opposite directions. Similarly, the turbine discs 4 and 5 carry a double rotation turbine blading 9.

The rotary system including the turbine discs and associated bladings is enclosed in a stationary casing 10, the end walls of which are sealed against the shaft ends 1 and 2 by means of shaft packings 11 and 12, respectively, and against the turbine discs 3 and 5 by means of labyrinth packings 13 and 14, respectively. Another labyrinth packing 15 is provided between the turbine discs 4 and 6. Formed in the end wall of the casing axially outside disc 3 and labyrinth packing 13 is an air chamber 16 having an air intake or intakes 17 and communicating on the other hand via an annular distributing space 18 and a set of ports 19 in disc 3 with the inner periphery of compressor blading 8.

Radially outside the rotary system of the unit the casing forms a combustion chamber 21 communicating directly with the outer periphery of compressor blading 8 and through ports 23 in the cylindrical flange 7 with the outer periphery of turbine blading 9.

The end wall of the casing axially outside turbine disc 5 and labyrinth packing 14 forms a chamber 24 communicating on the one hand with the inner periphery of turbine blading 9 via an annular space 25 in the end wall of the casing and ports 26 in turbine disc 5 and on the other hand through ports 27 either with the atmosphere or through conduit or conduits, not shown, with a heat recovery place or places.

In operation, air is drawn in through ports 17 and passes via chamber 16, space 18 and ports 19 to the inner periphery of compressor blading 8, through which the air is forced outwardly while being compressed so as to enter the combustion chamber 21 at a high pressure. In chamber 21 the air is mixed with finely divided fuel admitted through a spraying nozzle 28 and the mixture obtained is ignited in any suitable way, as by means of a sparking plug 29. The gases produced by the combustion of the mixture reach through ports 23 the outer periphery of turbine blading 9 and passes therethrough under expansion, thereby driving the turbine discs 4 and 5 and associated shafts 1 and 2 in opposite directions. Thus, in the continual operation of the unit the compressor discs 3 and 6 are driven by power yielded by the gas turbine. Starting of the turbo-compressor and gas turbine unit may be effected either by delivering compressed air to chamber 16 or by rotating the shafts 1 and 2 from an outer source.

The embodiment shown in Fig. 2 differs from that above described substantially by an inverse arrangement of the gas turbine blading 9. In addition, the chamber 21 surrounds the compressor section only and is sealed against the rotary discs thereof, on the one hand, by the labyrinth packing 13 and, on the other hand, by a labyrinth packing 31 provided between disc 6 and the right hand end wall of chamber 21. Chamber 21 communicates with chamber 24 through a conduit 30. The fuel injecting nozzle 28 and igniter 29 may be provided either in connection with chamber 21 or in connection with said conduit 30, as indicated in the drawing.

The air compressed in blading 9 is delivered to chamber 21 and the combustion gases produced in the conduit 30 flow to chamber 24 and thence via space 25 and ports 26 to the inner periphery of turbine blading 9 through which the gases pass outwardly under expansion and yielding of work. The waste gases may escape from turbine blading 9 through the ports 23 in the cylindrical flange 7 which may lead either to the atmosphere as shown, or conduits, not shown, to a heat exchange installation or installations.

In both of the embodiments above described the action of the centrifugal force on the air passing through blading 9 contributes to the compression work instead of counteracting it.

What I claim is:

1. In a power plant the combination of a turbo-compressor, a gas turbine, said compressor and said turbine each being the radial flow double rotation type, a common stationary casing therefor, two shafts centrally mounted with relation to said casing and adapted to rotate in opposite directions, two annular discs attached at their inner peripheries to one of said shafts at axially spaced points thereof, an annular disc attached at its inner periphery to the other shaft, said last mentioned disc having a disc supporting member at its outer periphery, another disc attached at a point between its inner and outer peripheries to said disc supporting member, said last mentioned disc being situated axially between the discs of the first mentioned shaft, the discs thus forming together three axially spaced radial passages between themselves, compressor blades in one end passage alternately attached to the respective discs, turbine blades alternately attached to the discs of the other end passage, labyrinth packing elements alternately attached to the discs of the intermediate passage, said compressor blades being arranged to operate while forcing the fluid under compression outwardly, the casing forming an annular chamber in free communication with the outer periphery of the set of compressor blades, means to introduce fuel into said chamber, means to ignite a mixture of this fuel and compressed air as produced by the compressor and delivered to said chamber, the chamber being in permanent communication with the inlet end of the set of turbine blades, the stationary and rotary elements of the plant having passages to allow admission of air to the compressor and expelling of exhaust gases from the turbine.

2. In a power plant the combination of a casing, a turbo-compressor and a gas turbine located at axially spaced points in said casing, the compressor and the turbine each being the radial flow double rotation type, the casing forming an annular chamber surrounding the turbine and the compressor and being in free communication with the outer peripheries of both of them, two shafts centrally mounted with relation to the casing so as to extend in alinement of each other, two discs attached at their inner peripheries to one shaft, a disc attached at its inner periphery to the other disc, a cylindrical disc supporting member extending axially from said last mentioned disc at the outer periphery thereof, another disc attached at a point between its peripheries to said disc-supporting member so as to extend into the space between the discs of said first-mentioned shaft, the discs of both shafts forming together three axially spaced radially extending passages between themselves, compressor blades attached alternately to the two discs of one end passage, said blades being adapted to force the fluid under compression outwardly, turbine blades in the other end passage carried alternately by the respective discs, said blades being adapted to be operated by the driving fluid while passed inwardly therethrough, said disc supporting member having apertures to effect a free communication between the surrounding chamber in the casing and the set of turbine blades, means to introduce fuel into said chamber, means to ignite a mixture of such fuel and compressed air within said chamber, labyrinth packing elements in the intermediate passage between the discs, the stationary and rotary elements of the plant having passages to allow admission of air to the inner periphery of the compressor and expelling of exhaust gases from the inner periphery of the turbine.

3. In a power plant, the combination of a stationary casing, two shafts adapted for rotation in opposite directions centrally mounted with respect to said casing so as to extend in alinement of each other, two annular discs attached at their inner peripheries to one shaft at axially spaced points thereof, an annular disc attached at its inner periphery to the end of the other shaft, said last mentioned disc having a cylindrical disc-supporting member at its outer periphery, another disc attached at a point between its peripheries to said supporting member so as to extend into the space between the discs of the first mentioned shaft, said discs forming altogether three axially spaced radially extending passages between themselves, compressor blades in one end passage attached alternately to the respective discs so as to form together with said discs a turbo-compressor of the radial flow double rotation type, said blades being adapted for forcing the fluid to be compressed from the inner towards the outer periphery of the respective passage, turbine blades in the other end passage attached alternately to the respective discs, so as to form together with said discs a radial flow double rotation turbine, said turbine blades being adapted to be operated by a driving fluid passed from the inner towards the outer periphery of the respective passage, the casing forming an annular chamber surrounding the compressor and being in free communication with the outer periphery thereof, a conduit leading from said chamber to another chamber of the casing, means to introduce fuel in said conduit, means to ignite a mixture of such fuel and compressed air in said conduit, the stationary and rotary elements of the plant having passages to admit combustion products from said conduit to the inner periphery of the set of turbine blades, other passages to admit air to the inner periphery of the set of compressor blades, and passages to allow expelling of the exhaust gases from the outer periphery of the set of turbine blades to the atmosphere.

RAGNAR OLOV JACOB MÖLLER.

REFERENCES CITED

The following references are of record in the file of this patent:

UNITED STATES PATENTS

| Number | Name | Date |
|---|---|---|
| 2,404,767 | Heppner | July 23, 1946 |

FOREIGN PATENTS

| Number | Country | Date |
|---|---|---|
| 467,630 | Great Britain | June 21, 1937 |